United States Patent [19]
Neitzel et al.

[11] Patent Number: 6,071,033
[45] Date of Patent: Jun. 6, 2000

[54] PIN RETAINER

[75] Inventors: Daniel R. Neitzel, Elgin; Rajesh M. Krishnan, Naperville, both of Ill.

[73] Assignee: Caterpillar Inc., Peoria, Ill.

[21] Appl. No.: 09/078,028

[22] Filed: May 13, 1998

Related U.S. Application Data

[60] Provisional application No. 60/050,259, Jun. 19, 1997.
[51] Int. Cl.[7] .................................... F16C 11/00
[52] U.S. Cl. .................... 403/158; 403/150; 403/163; 403/154; 414/722
[58] Field of Search .................................. 403/150, 151, 403/156, 154, 158, 161, 162, 163, 41; 414/722, 723; 901/49; 37/468, 411, 419, 184

[56] References Cited

U.S. PATENT DOCUMENTS

| | | | |
|---|---|---|---|
| 4,243,341 | 1/1981 | Kabay et al. | 403/158 X |
| 4,507,005 | 3/1985 | Siewert et al. | 403/16 |
| 4,629,350 | 12/1986 | Siewert et al. | 403/11 |
| 4,652,167 | 3/1987 | Garman | 403/158 |
| 4,772,150 | 9/1988 | Horton | 403/39 |
| 4,815,191 | 3/1989 | Garman et al. | 403/158 X |
| 4,913,577 | 4/1990 | Forslund et al. | 403/158 |
| 5,630,673 | 5/1997 | Krzywanos et al. | 403/158 |

OTHER PUBLICATIONS

950F Wheeler Loader Parts Book—Publication No. SEBP1926–01 Published Oct. 1992—p. 207.

*Primary Examiner*—Lynne H. Browne
*Assistant Examiner*—John R. Cottingham
*Attorney, Agent, or Firm*—William C. Perry

[57] ABSTRACT

In many pinned connections between the frames of a machine such as an articulated construction machine, the forces passing through the pin connection caused flexing of the various bolted connections which ultimately could cause the loosening or failure of the bolts. The present invention provides a retainer member for a pin member that has a groove positioned in an engagement surface to divide the engagement surface into radial inner and outer portions. A plurality of fasteners are positioned in the radially inner engagement surface to secure the retainer member to the pin member. The radially outer engagement surface, having a reduced cross-section and no fasteners, is allowed to flex to accommodate the forces passing from one frame to the other, thus maintaining the integrity of the bolted connection.

16 Claims, 1 Drawing Sheet

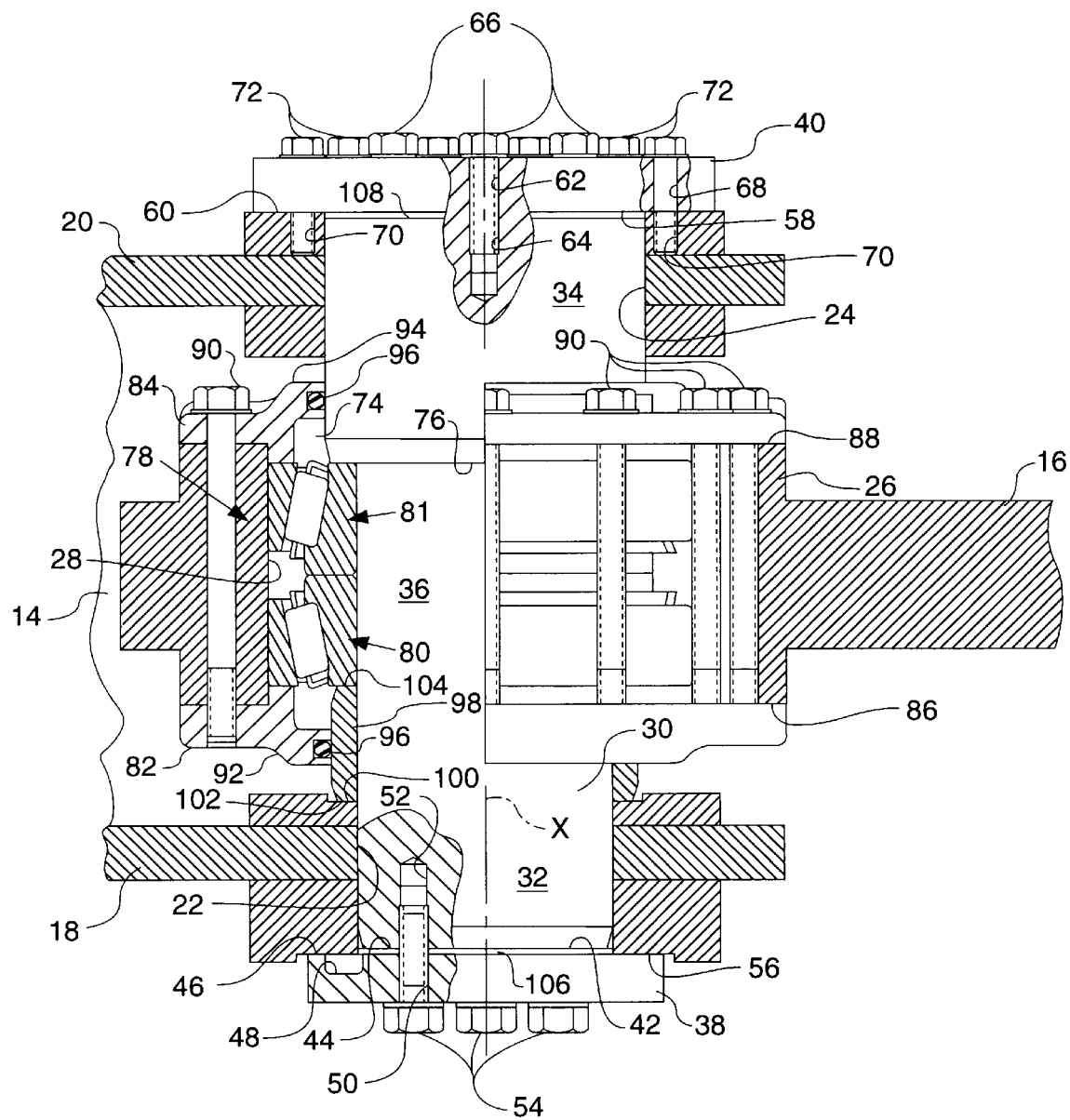

6,071,033

PIN RETAINER

CROSS REFERENCE TO RELATED APPLICATIONS

This application claims the benefit of prior provisional patent application Ser. No. 60/050,259 filed Jun. 19, 1997.

TECHNICAL FIELD

This invention relates to a retaining apparatus for a pin and more particularly to a pin member in an articulating joint.

BACKGROUND ART

In many construction machines, it is advantageous to provide a pair of frame assemblies that will pivot with respect to one another at a point that is near the center of the machine. This type of machine is known as an "articulated" machine and provides greatly increased maneuverability and handling.

One problem that exists with an articulated machines is the transfer of forces through the hitch assembly or articulation point. The two frame assemblies are connected to one another by a pinned joint, usually at upper and lower extremities. The forces that occur typically result from machine operation over uneven terrain which must pass through the hitch assembly. Also, a pair of steering cylinders typically extend between the frames to pivot the front frame with respect to the rear to provide steering for the machine. These forces also are directed through the hitch. As these forces pass through the hitch, they cause deflection of the respective portions of the hitch assembly. These deflections have been known to cause failure in the hitch assembly, primarily in the area of pin retention.

Since each hinge point rotates around a large pivot pin, the means by which the pin is secured to the two frames also becomes affected by the deflections of the two frames. In most cases the fastening means is in the form of a plurality of bolts. These bolts normally extend through at least a retaining cap that is secured to at least one end of the pin and the frame that surrounds the pin. As the forces are passed through the frame members and the pin, the deflection occurs in the area of the bolts. As this occurs, it is common for the bolts to break or loosen, which will eventually lead to the loss of the pin or the entire destruction of the hitch assembly in this area. This of course, adds to the down time of the machine and the overall cost of machine operation.

The present invention is directed to overcoming one or more of the problems listed above.

DISCLOSURE OF THE INVENTION

In one aspect of the present invention, a retaining apparatus is provided that includes a first frame that has a bore defined therein. A second frame is provided that has also has a bore defined therein and is; positioned adjacent the first frame with the respective bores aligned with one another along a common axis. A pin member is positioned within the aligned bores along the common axis. A retainer member is included that has a groove defined on a first surface thereof to define an inner and outer engagement portion. The retainer member is positioned with the inner engagement surface in contact with the pin member and the outer engagement in contact with the pin member and the outer engagement surface in contact with one of the first and second frames. At least one fastening member is positioned for engagement with the inner engagement portion and the pin member to secure the position of the pin member within the aligned bores.

In another aspect of the present invention, a retaining apparatus for a hitch assembly of an articulated machine is provided that includes a first frame that has first and second arms. Each arm has a bore defined therein and are spaced in parallel relationship to one another with the respective bores aligned along a common axis. A second frame is provided that also has a bore defined therein and is positioned between the first and second arms of the first frame member with the bore thereof positioned along the common axis. A pin member is provided that has a first end portion that has at least one mounting bore defined therein and is positioned within the aligned bores defined by the first and second frames. A retainer member is provided that defines a radially inner and outer engagement portion with the inner engagement portion having at least one mounting bore formed therein. The retainer is positioned for engagement with the first end of the pin member with the respective mounting bores defined by the inner engagement portion aligned with the mounting bores defined by the pin member and the outer engagement portion positioned for engagement with one of the first and second arms of the first frame. The inner and outer engagement portions are separated by a groove defined on the first surface of the retainer member. A fastening member is positioned within the aligned mounting bores of the retainer member and pin member to secure the respective members together.

BRIEF DESCRIPTION OF THE DRAWINGS

FIG. 1 is a diagrammatic cross-sectional view of a hitch pin assembly that embodies the principles of the present invention.

BEST MODE FOR CARRYING OUT THE INVENTION

Referring now to the drawing, it can be seen that a retaining apparatus, generally shown at 10, is shown to be adapted for use with a pivot pin for the hitch assembly of an articulated machine (not shown). The articulated machine has a front and rear frames, 14 and 16 respectively, that are pivotally mounted to one another in a well known manner along a generally vertically extending axis X.

The front or first frame 14 includes a first and second arm, 18 and 20 respectively. The arms 18 and 20 are spaced from one another and extend generally in a horizontal plane in parallel relation to one another. Each arm has a bore, 22 and 24 respectively, defined therein that are aligned with one another along the axis X.

The rear or second frame 16 is positioned on the opposite side of the axis X from the first frame 14 and defines a single arm 26 that is positioned between the first and second arms 18 and 20 of the first frame and is generally parallel thereto. A bore 28 is defined in the second frame 16 and is alignable along the axis X when the second frame is positioned between the arms of the first frame.

A pin member 30 is positioned within the aligned bores 22, 24 and 28 and has a first end portion 32 positioned within the bore 22 defined by the first arm 18 and a second, enlarged end portion 34 positioned within the bore 24 defined by the second arm 20. A mid-portion 36 of the pin is positioned within the bore 28 defined by the single arm 26 of the second frame 16. The pin member 30 is retained in the respective bores by a first retainer member 38 that engages the first arm 18 of the first frame member 14 and the first end portion 32 of the pin member. In a similar fashion, a second retainer member 40 engages the second arm 20 of the first frame 14 and the second end portion 34 of the pin member.

The first retainer 38 is defined by a disc-shaped plate that has an engagement surface 42 that in turn defines an radially inner and outer engagement surface, 44 and 46 respectively. The radially inner and outer engagement surfaces are separated by a groove 48. A plurality of mounting bores 50 extend through the first retainer member 38 radially inwardly of the groove 48 in the area of the radially inner engagement surface 44. The mounting bores 50 are alignable with tapped mounted bores 52 defined in the first end portion 32 of the pin member 30. The aligned bores 50 and 52 are adapted to receive a plurality of suitable fasteners, such as bolts 54, to secure the retainer member to the first end portion of the pin member. The radially outer engagement surface 46 has a diameter larger than that of the first end portion 32 of the pin member 30 and it extends radially outwardly beyond the circumferential extremity of the pin member to engage an outer surface 56 defined by the first arm 18 of the first frame 14. The groove 48 is positioned on the engagement surface 42 of the retainer member 38 in a pre-selected location so that the radially outer engagement surface 46 is reduced in effective length when compared to that of the radially inner engagement surface 44. Likewise, the cross-sectional area of the retainer 38 in the area of the radially outer engagement surface 46 is also reduced with respect to that in the area of the radially inner engagement surface 44.

The second retainer member 40 also comprises a disc-shaped plate member that has a substantially planer engagement surface 58. The engagement surface 58 extends across the entire width of the second retainer member and engages both the second end portion 34 of the pin member 30 and an outer surface 60 defined by the second arm 20. The second retainer member defines a second plurality of mounting bores 62 (one shown) that are positioned to align with a second plurality of tapped mounting bores 64 (one shown) that are defined in the second end portion 34 of the pin member 30. Likewise, a second plurality of fasteners, such as bolts 66, are received within the aligned mounting bores 62 and 64 and secure the second retainer member to the second end portion of the pin member. In addition, a third plurality of mounting bores 68 are defined in the second retainer member that are positioned radially outwardly from the second plurality of mounting bores 62. The third plurality of mounting bores 68 are alignable with a plurality of mounting bores 70 defined in the outer surface 60 of the second arm 20. A third plurality of fasteners, such as bolts 72 are received in the aligned bores 68 and 70 and secure the second retainer member to the second arm in addition to the pin member 30. While the second retainer is shown to be a separate plate member that is secure to both the second end portion of the pin member and the second arm member, it is to be understood that the second retainer could be an enlarged head portion that is integrally formed on the pin member without departing from the intent of the subject invention.

The pin member 30 defines a shoulder 74 that is positioned between the respective end portions 32 and 34, generally along the mid-portion 36 of the pin member, and defines a radially directed end face 76. The shoulder acts as an abutment for a bearing assembly 78 that is positioned in the bore 28 defined by the single arm 26 of the second frame 16. The bearing assembly, in the instant embodiment, comprises a pair of roller bearings 80 and 81 that are captured between a pair of end plates 82 and 84 that engage opposing surfaces 86 and 88 respectively, defined by the second frame. The end plates 82 and 84 are secured in position by a plurality of bolts 90 that extend entirely through the second frame. Each of the end plates define a flange 92 and 94 respectively, that mounts a seal 96 to maintain lubrication within the bearing assembly in a well known manner. The end plate 84, as viewed in the drawing, supports a seal 96 that engages the pin member 30 while the end plate 84 supports a similar seal 96 that engages a spacer sleeve 98. The spacer sleeve 98 is positioned about the pin member 30 to engage an inner surface 100 of the first arm 18 on one end portion 102 thereof and the roller bearing 80 on the opposing end portion 104 thereof. A shim assembly 106 is positioned between the first end portion 32 of the pin member 30 and the first retainer member 38 to occupy any space there may be between the two members. The spacer sleeve 98 is utilized to provide pre-load to the bearing assembly 78 by insuring that there is continuous contact between the inner surface 100 of the first arm 18, the spacer sleeve 98, the pair of roller bearings 80 and 81, and the radially directed end face 76 of the pin member 30. A second shim assembly 108 may also be used to fill any space that may exist between the second end portion 34 of the pin member 30 and the second retainer member 40. The second shim assembly 106 provides continuous contact between the respective outer surfaces 56 and 60 of the first and second arms through contact with the pin member 30. While the shim assembly 108 is shown to be positioned between the second end portion 34 of the pin member 30 and the engagement surface 58 of the second retainer member 40, the shim could also be positioned between the engagement surface 58 and the outer surface 60 of the second arm member without departing from the intent of the present invention. In both arrangements, continuous contact between the outer surfaces of the first and second arms is provided through contact with the pin member. With this particular retaining apparatus, forces may be passed in three dimensions from one frame to the other.

INDUSTRIAL APPLICABILITY

During assembly of an articulated machine, the first and second frame members, 14 and 16 respectively, are positioned such that the second frame 16 is positioned between the first and second arms 18 and 20 respectively, defined by the first frame 14 with the respective bores 22, 24 and 28 in alignment with one another along axis X. The bearing assembly 78 is secured within the bore 28 of the second frame. The pin member 30 is inserted within the aligned bores with the shoulder 74 of the pin member abutting the uppermost roller bearing 80 and the lowermost roller bearing 81 in abutment with the spacer sleeve 98. The distance if any, between the first end portion 32 of the pin member 30 and the first retainer member 38 is determined and filled with an appropriate amount of shims 106. The mounting bolts 54 are then inserted into aligned bores 50 and 52 and torqued to a proper amount to provide sufficient pre-load to the bearing assembly 78. The distance between the second end portion 34 of the pin member 30, and surface 58 of the second retainer 40, is determined and an appropriate amount of shims 108 are positioned between the second end portion of the pin member and the second retainer member 40 to fill that space. The second plurality of mounting bolts 62 are installed to secure the second retainer member 40 to the second end portion 34 of the pin member and the third plurality of mounting bolts 72 are installed to secure the second retainer member 40 to the second arm 20. This design and mounting arrangement will provide the transfer of forces from one frame to the other in horizontal, vertical and radial directions. During the transmission of these forces, there is a tendency for the frames and related mounting components to flex under loading. This flexing is accommodated by the first retainer member 38. Since the first retainer member is secured only to the first end portion 32 of the pin member 30 and extends radially beyond the pin member to engage the outer surface 56 of the first arm 18, the flexing will not occur between the radially inner engagement surface 44 of the first retainer member 38 and the pin member. Since the groove 48 is positioned between the radially inner and outer engagement surfaces, 44 and 46 respectively, the flexing is localized in the area of the radially outer engagement surface due to the reduced cross-sectional area created by the groove. By maintain the flexing in this portion of the first retaining member, the bolts 54 are not subjected to deflection and thus do not tend to loosen or break.

While the first retainer is the only one of the two retainers that has a groove positioned therein to localize the flexing of the components, it is to be understood that the second retainer could also be configured to define a groove and benefit from the same advantages realized by the first retainer. In addition, it is anticipated that both retainers so configured could be used in combination with one another.

Other aspects, objects and advantages of this invention can be obtained from a study of the drawings, the disclosure and the appended claims.

We claim:

1. A retaining apparatus, comprising:
   a first frame having a bore defined therein,
   a second frame having a bore defined therein, said second frame being positioned adjacent the first frame with the respective bores aligned with one another along a common axis;
   a pin member positioned within the aligned bores along the common axis;
   a retainer member having a groove defined on a first surface thereof to define an inner and outer engagement portion, said retainer member being positioned with the inner engagement portion in contact with the pin member and the outer engagement portion in contact with one of the first and second frames; and
   at least one fastening member positioned for engagement with the inner engagement portion and the pin member to secure the position of the pin member within the aligned bores.

2. The retaining apparatus as set forth in claim 1 wherein the first frame defines first and second arms, each arm having a bore defined therein, said arms being positioned in spaced, relationship to one another on opposite sides of the second frame with said bores being aligned along the common axis.

3. The retaining apparatus as set forth in claim 2 wherein the pin member has a first end portion engaged with the first arm of the first frame and a second end portion engaged with the second arm of the first frame and a mid portion engaged with the second frame.

4. The retaining apparatus as set forth in claim 3 wherein the pin member has a first end portion that defines a plurality of mounting bores therein.

5. The retaining apparatus as set forth in claim 4 wherein the retaining member defines a plurality of mounting bores that are alignable with the mounting bores defined in the first end portion of the pin member to receive a first plurality of mounting bolts.

6. The retaining apparatus as set forth in claim 5 wherein the mounting bolts are positioned radially inwardly of the groove defined in the retainer member.

7. The retaining apparatus as set forth in claim 3 wherein a second retainer member is engaged with the second end portion of the pin member and the second arm.

8. The retaining apparatus as set forth in claim 7 wherein a second plurality of mounting bolts secures the second retainer member to the second end portion of the pin member and a third plurality of mounting bolts secures the second retaining member to the second arm of the first frame.

9. The retaining apparatus as set forth in claim 1 wherein the groove is positioned on the retainer member at a preselected location to reduce the amount of material of the retainer member in the area of the outer engagement surface to allow the outer engagement surface to deflect with respect to the inner engagement surface when the first and second frames are subjected to loading.

10. A retaining apparatus for a hitch assembly of an articulated machine, comprising:
    a first frame having first and second arms, each arm having a bore defined therein, said arms being spaced in parallel relationship to one another with said bores positioned along a common axis;
    a second frame having a bore defined therein, said second frame being positioned between the first and second arms of the first frame member with the bore thereof positioned along the common axis;
    a pin member having a first end portion having at least one mounting bore defined therein and being positioned within the aligned bores defined by the first and second frames;
    a retainer member having a radially inner and outer engagement portion defined on a first surface, said inner engagement portion having at least one mounting bore formed therein and being positioned for engagement with the first end portion of the pin member with the respective mounting bores in alignment with one another and said outer engagement portion positioned for engagement with one of the first and second arms of the first frame, said inner and outer engagement portions being separated by a groove defined on the first surface of the retainer member; and
    a fastening member positioned within the aligned mounting bores of the retainer member and pin member to secure the respective members together.

11. The retaining apparatus as set forth in claim 10 wherein the pin member has a second end portion having an enlarged head portion and a shoulder defined thereon that is axially spaced from the second end portion, said shoulder being positioned for engagement with a bearing assembly mounted within the bore defined by the second frame when the pin member is positioned with the aligned bores.

12. The retaining apparatus as set forth in claim 11 wherein the bearing assembly connected to the second frame member, includes first and second bearings and a spacer that are positioned between the shoulder defined by the pin member and an inner surface defined by the first arm member to maintain continuous contact therebetween when the pin member is positioned within the aligned bores.

13. The retaining apparatus as set forth in claim 12 wherein the retainer member is positioned for engagement with an outer surface of the first arm member with a shim assembly therebetween, said shim assembly being adjustable with respect to any gap that may exist between the first end portion of the pin and the outer surface of the first arm to take up any space therebetween and thereby provide substantially continuous contact between the respective outer surfaces of the first and second arms through contact between the enlarged head portion of the pin member and the retainer member.

14. The retaining apparatus as set forth in claim 11 wherein the enlarged head portion includes a second retainer member that is engageable with the second end portion of the pin member and an outer surface defined by the second arm and defines the enlarged head portion of the pin member.

15. The retaining apparatus as set forth in claim 14 wherein a plurality of mounting bores are positioned for alignment in the second end portion of the pin and the second retainer member, said aligned mounting bores being adapted to receive a second plurality of fasteners to secure the second retainer to the second end portion of the pin.

16. The retaining apparatus as set forth in claim 14 wherein a plurality of mounting bores are defined in an outer surface of the second arm and are positioned for alignment with a third plurality of bores defined in the second retainer member, said aligned mounting bores being adapted to receive a third plurality of fasteners to secure the second retainer to the second arm of the first frame.

* * * * *